UNITED STATES PATENT OFFICE.

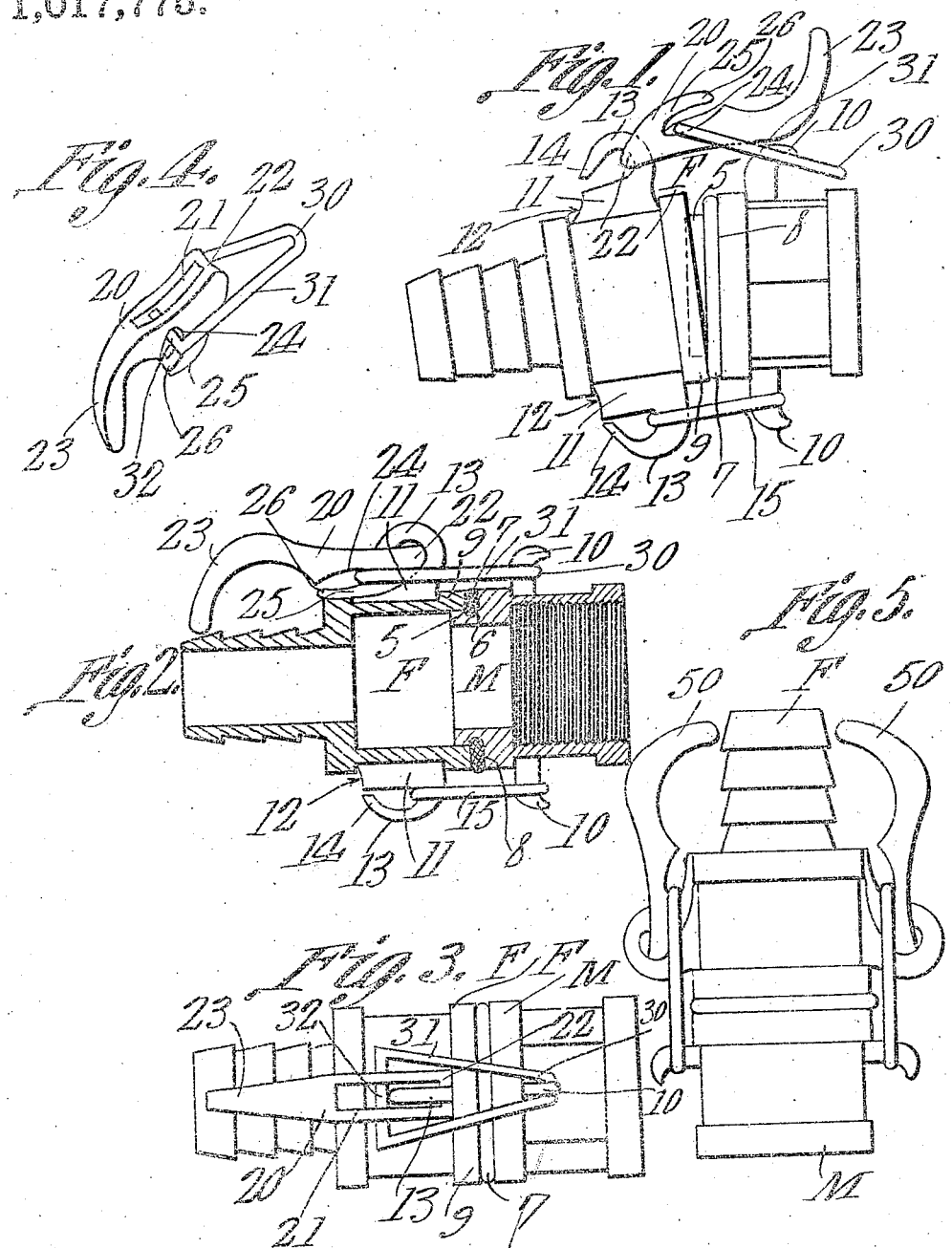

EDWARD LE BRETON, OF CLEVELAND, OHIO.

HOSE-COUPLING.

1,017,775.      Specification of Letters Patent.      Patented Feb. 20, 1912.

Application filed April 11, 1911. Serial No. 620,301.

*To all whom it may concern:*

Be it known that I, EDWARD LE BRETON, a citizen of the United States, residing at Cleveland, in the county of Cuyahoga and State of Ohio, have invented a new and useful Hose-Coupling, of which the following is a specification.

This invention relates to water distribution, and more especially to detachable pipe couplings; and the object of the same is to produce a coupling by means of which the extremities of two sections of hose can be quickly connected in a water-tight manner by a coupling which is not easily thrown out of action through contact with extraneous objects and which positively holds the parts against longitudinal strain, and whereby they can be as readily disconnected when desired. This object is carried out by the construction described and claimed below and shown in the drawings wherein—

Figure 1 is a side elevation of the parts of this coupling showing them in the position they assume as they are about to be put together. Fig. 2 is a central longitudinal section and Fig. 3 a top view showing the members connected with each other. Fig. 4 is perspective detail of the locking lever and bail. Fig. 5 is a side elevation showing a modified form of the invention.

In the drawings I have shown a male member M and a female member F, the former having a tubular nose 5 with a surrounding groove 6 in which fits a soft gasket 7 resting against a shoulder 8, and the extremity of the female member F is thickened as at 9 at its mouth where it rests against this gasket when the two members are clamped together. This is a detail of structure which I prefer to employ in connection with my improved coupling, because the clamp is very powerful and positive and a short and rather thick gasket should coöperate with it in order to produce a water-tight joint.

The outer ends of the members, shown herein may be formed as illustrated or in any approved manner so as to make connection with the hose pipe sections not shown but which it is the intention of this coupling to connect.

It is well known that fire and garden hose is subjected to rather rough usage, being often dragged along the ground laterally or longitudinally, and it is the couplings which suffer at such times because they project beyond the contour of the body of the hose.

One object I have in view is to provide a coupling of such shape and character that it will not suffer injury by rough usage of the hose and cannot become unlatched or disconnected accidentally in this way.

Coming now more particularly to the present invention, the male member M is provided with a pair of oppositely disposed and radially projecting hooks 10. It is to be understood that I am describing the construction shown, although it could of course be reversed and the parts here shown on male member could be put upon the female member instead. In line with these the female member F is provided with two oppositely disposed and radially projecting lugs 11, each having a rather thin body extending longitudinally of this member from a point just behind its thickened edge 9 to a shoulder 12 facing away from the extremity of the member F. The outer edge of each lug is cut off straight, excepting that from its front corner projects a hook 13 whose bill is closed nearly or quite into contact with the lug at its extremity as at 14. One of these hooks carries a link 15 which is of such length that its remote end can be engaged with one of the hooks 10 on the member M. Into the other hook 13 is pivotally engaged a lever 20 (best seen in Fig. 4) which is of rather peculiar construction. Its body is slotted as at 21 from a point near its fulcrum end 22 backward toward its handle 23 and in a plane at right angles to the length of said fulcrum, this slot being of a size to embrace the hook 13 whether the lever stands in the position shown in Fig. 1 or is thrown over to the position shown in Fig. 2. Some distance back of its fulcrum end the lever is formed with a transverse eye 24, and as herein shown this eye is produced by forming a hook 25 on the under side of the lever and closing its bill nearly against its body as at 26, although the slot 21 should be continued through the hook as seen in Fig. 4. However, the eye can be made in any other way, although I find this way convenient because the bail next to be described can be readily inserted in and removed from an eye when so made. Said bail is substantially triangular in plan view as best seen in Fig. 3. Its outer end 30 engages one of the hooks 10 on the member M, and from that point its sides 31 diverge to its other end and there they are connected by a transverse cross bar 32 which is pivotally mounted in said eye 24 of the lever however the eye is made. The opening through this bail is of a size to permit it to freely inclose the wider end of the lever 20 so that the latter may have all the movements necessary.

In connecting the members of a hose coupling thus formed, they are brought together as seen in Fig. 1 and the link engaged with either hook that happens to be at the bottom and in which relative position we may so describe the device. The lever being swung forward as shown, the bail is than passed over the uppermost hook and the extremity of the female member F is seated against the gasket of the male member. The lever is turned over to the position shown in Fig. 2 as the arrow indicates, and as its eye 24 passes around its fulcrum 22 which latter finds its bearing within the hook 13, the hook and with it the upper side of the female member is moved forcibly toward the male member so that the gasket is compressed and the two members are coupled in a water-tight manner. As the lever comes to rest in the position shown in Figs. 2 and 3 the cross bar 32 of the bail engages over the shoulder 12 of the lug 11 and the pressure exerted by the expansive force of the gasket is resisted by the bail and its contact with this shoulder and with the hook on the other member. This I consider one of the most important features of my invention.

I desire to emphasize the fact that when the parts are properly constructed and shaped the bail takes the strain off the lever, and the members of the coupling are held connected at one side by this bail engaging the lug on one member and the hook on the other while said members are held connected at the other side by the link performing the same function. The lever then lies in the position seen in Figs. 2 and 3, and the extremity of its rounded handle 23 rests at a remote point on the coupling member or on the hose itself and cannot be thrown out of operative position when the latter is drawn over the ground either longitudinally or laterally. In fact, it requires considerable force to raise the free end of the lever handle as is necessary to disconnect this coupling, and in doing so the eye 24 obviously moves the cross bar 32 of the bail off its seat upon the shoulder 12 and carries it outward beyond the fulcrum point 22. As soon as the line of the strain passes said fulcrum point, the lever flies over to the position shown in Fig. 1 and the outer end 30 of the bail is automatically disengaged from the uppermost hook on the member M.

Thereafter of course the link is disengaged from the opposite hook, and the two members are entirely disconnected.

The parts of this coupling may be made of any suitable material, and of such sizes and proportions as are necessary for the use to which it is to be put.

As above intimated, the exact shape of the outer ends of the two members is not at all essential to the shape of their inner ends which form parts of the coupling, and in the drawings said outer ends are shown differently formed at the opposite extremities of the entire device the better to illustrate the fact that they could be made in a variety of ways. In fact, this coupling could be used between one rigid pipe and one hose section, although its uses are not necessary of amplification here.

In the form of the invention shown in Fig. 5, no new structural elements are introduced into the device. However, as denoted by the numeral 50, two levers may be employed, one of said levers replacing the element 15, as will be understood clearly, by a comparison of Figs. 2 and 5.

What is claimed as new is:—

1. The herein described hose coupling comprising oppositely disposed hooks on one member, oppositely disposed lugs on the other member, one of the lugs having a shoulder facing away from the extremity of its member, a link connected with the other lug and adapted to engage one hook, a triangular bail whose smaller end engages the other hook and whose cross bar engages said shoulder when the members are coupled, a hook on this lug projecting through the bail and having its bail close down onto the lug adjacent said shoulder, and a lever having a transverse eye loosely embracing said cross bar, a slot at right angles to the eye and loosely embracing the bill of the hook, a transverse fulcrum at the extremity of said slot journaled loosely through said hook, and a handle at the remote end of the lever curved inward toward the coupling.

2. The herein described hose coupling comprising oppositely disposed hooks on one member, oppositely disposed lugs on the other member, one of the lugs having a shoulder facing away from the extremity of its member, a link connected with the other lug and adapted to engage one hook, a triangular bail whose smaller end engages the other hook and whose cross bar engages said shoulder when the members are coupled, the shouldered lug having an eye, and a lever having a transverse eye loosely embracing said cross bar, a slot at right angles to the eye of the lever, and loosely embracing the lug, a transverse fulcrum at the extremity of said slot journaled loosely through the eye of the lug, and a handle at the remote end of the lever.

3. A device of the class described comprising coöperating coupling members, one of which is provided with a projection, the other of which is provided with a hook, the bill of the hook extending away from the projection; a lever extended toward its free end in the same direction as the bill of the hook, the lever having its other end seated in the bend of the hook, there being an opening in the lever to receive the bill of the hook, the lever having a notch in one edge, the mouth of which notch is disposed toward the free end of the lever; and a link engaged in the notch and with the projection.

In testimony that I claim the foregoing as my own, I have hereto affixed my signature in the presence of two witnesses.

EDWARD LE BRETON.

Witnesses:
DANIEL CARR,
Mrs. EDWARD LE BRETON.